United States Patent [19]

Shepler

[11] Patent Number: 4,543,496

[45] Date of Patent: Sep. 24, 1985

[54] DATA CONVERTER AND LINE DRIVER FOR A DIGITAL DATA COMMUNICATION SYSTEM

[75] Inventor: John E. Shepler, Rockford, Ill.

[73] Assignee: Sundstrand Corporation, Rockford, Ill.

[21] Appl. No.: 545,483

[22] Filed: Oct. 26, 1983

[51] Int. Cl.[4] .................................. H03K 17/56
[52] U.S. Cl. ...................... 307/261; 307/445; 307/490
[58] Field of Search .............. 307/445, 491, 490, 261; 328/133

[56] References Cited

U.S. PATENT DOCUMENTS

| | | | |
|---|---|---|---|
| 3,594,649 | 7/1971 | Rauch | 307/261 |
| 3,805,153 | 4/1974 | Gallant | 328/133 |
| 4,017,743 | 4/1977 | Hartman | 307/242 |
| 4,229,701 | 10/1980 | Bourner | 307/518 |

Primary Examiner—Stanley D. Miller
Assistant Examiner—B. P. Davis
Attorney, Agent, or Firm—Wood, Dalton, Phillips, Mason & Rowe

[57] ABSTRACT

A data converter comprises a pair of NAND gates and a pair of bipolar differential operational amplifiers. Monopolar binary digital data in uninverted and inverted forms and a clock signal are connected with the NAND gate inputs. The NAND gate outputs are complementary monopolar data signals at the clock frequency and are cross-coupled to the direct and inverting inputs of the operational amplifiers. The outputs of the operational amplifiers are complementary bipolar data signals. Low pass filters establish the rise and fall times of the bipolar data signals and the high frequency response limit. Voltage buffers isolate the converter from the data transmission line and include current limiting resistors which prevent damage in the event of a short circuit of the line.

9 Claims, 2 Drawing Figures

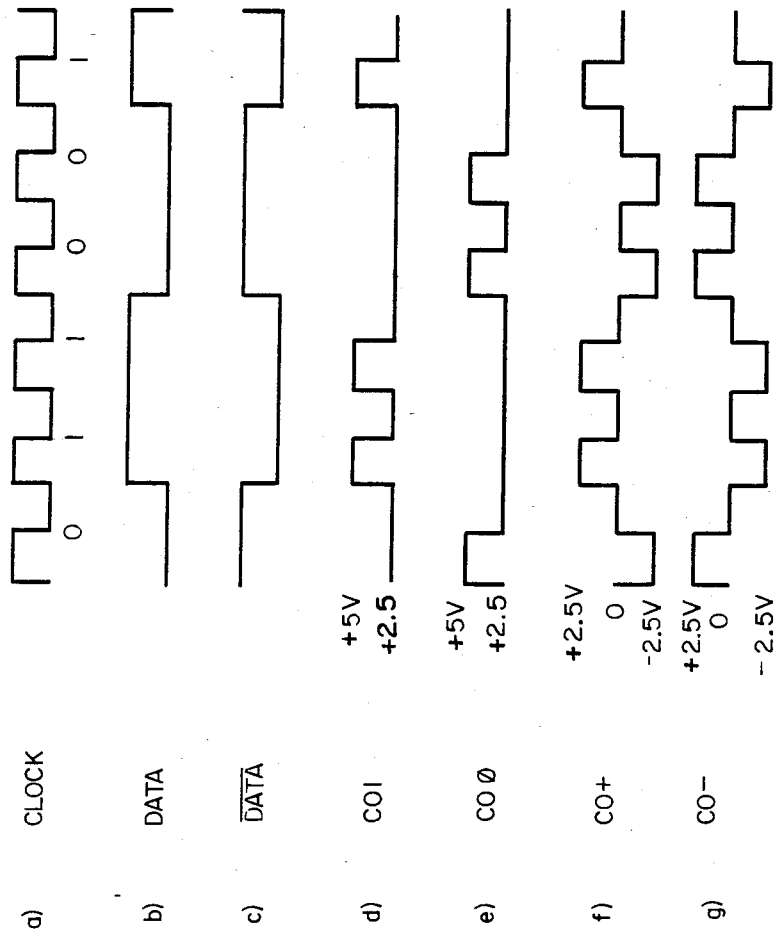

DATA CONVERTER AND LINE DRIVER FOR A DIGITAL DATA COMMUNICATION SYSTEM

DESCRIPTION

1. Field of the Invention

This invention relates to a digital data communication system in which monopolar binary data is converted to complementary bipolar form and coupled with a balanced data transmission line.

2. Background of the Invention

Digital data is typically generated and manipulated in monopolar form. It is sometimes desirable to represent the data information in bipolar complementary form for transmission from one point to another over a balanced two wire data link.

SUMMARY OF THE INVENTION

A principal feature of the invention is a data converter having inputs of monopolar binary digital data and a clock signal at twice the data frequency, and an output of complementary bipolar data with intervals between data pulses.

More particularly, it is a feature of the data converter that it includes first and second two input NAND gates each having one input connected with the clock signal source, the first NAND gate having uninverted data connected with its other input and the second NAND gate having inverted data connected with its other input. The outputs of the NAND gates are complementary, monopolar data signals at the clock frequency and with intervals between pulses. First and second bipolar differential operational amplifiers have inverting and noninverting inputs cross-coupled to the outputs of the NAND gates, the outputs of the operational amplifiers beng complementary bipolar data signals with intervals between data pulses.

Another feature of the converter is that each of the NAND gates has an open collector output circuit. A resistor is connected in series with the NAND gate output circuit across a DC voltage source forming a voltage divider establishing the voltage level of the data signals at the NAND gate outputs.

Still another feature is the provision of low pass filters which establish the rise and fall times of the data signals and the high frequency limit for the data.

And another feature is the provision of voltage buffer amplifiers connected between the outputs of the operational amplifiers and the data transmission line.

Further features and advantages will readily be apparent from the following specification and from the drawings.

BRIEF DESCRIPTION OF THE DRAWINGS

FIG. 2 are signal waveforms useful in describing the operation of the data converter.

Figure 1:
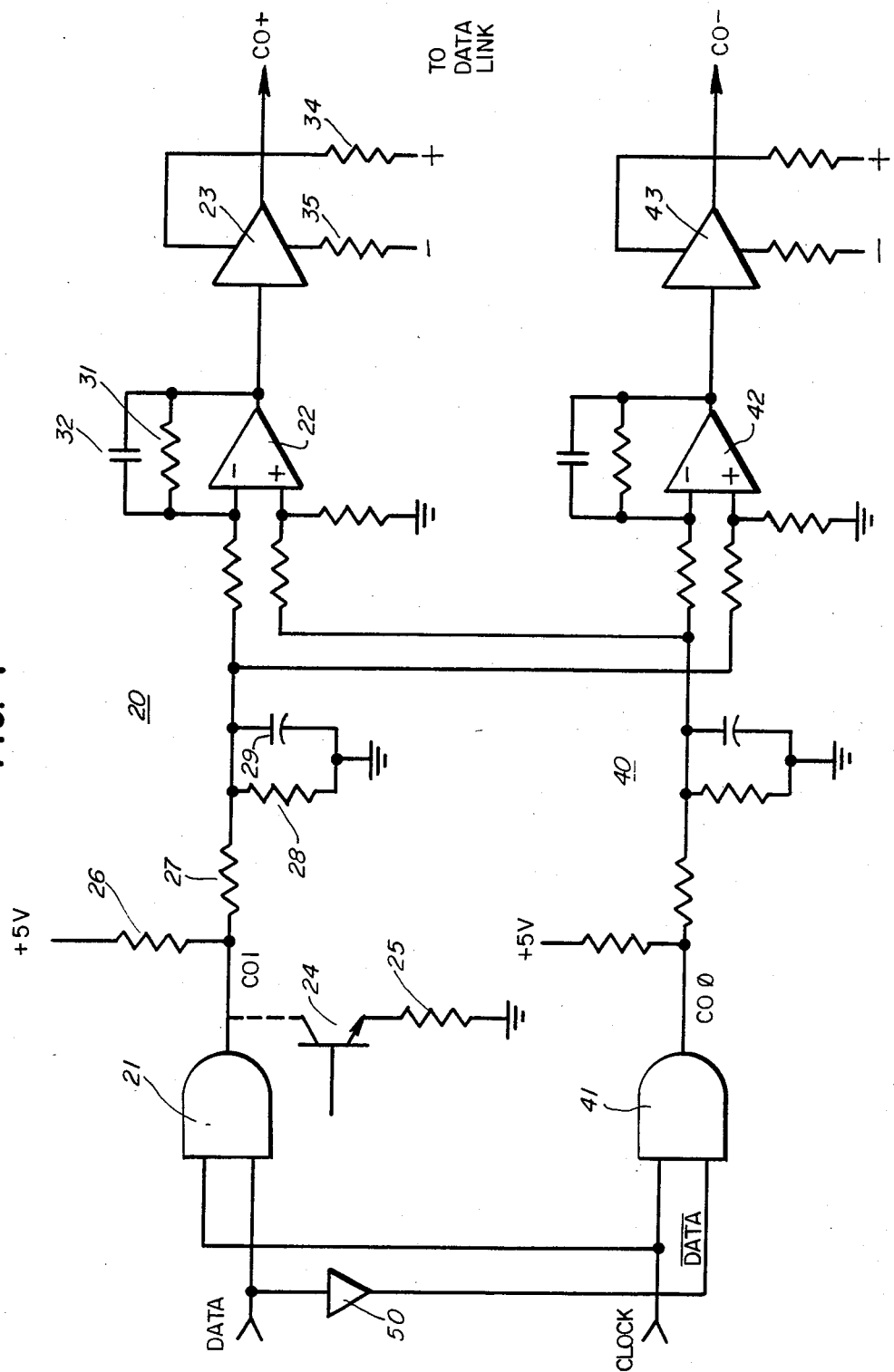
FIG. 1 is a schematic diagram of a data converter illustrating the invention.

A binary digital data signal in monopolar form provides the data input for the data converter disclosed herein. A typical monopolar data signal is shown in FIG. 2b, representing the binary digits 011001. A clock signal, FIG. 2a, with a frequency twice that of the data, is the other input to the converter.

The data converter, FIG. 1, has two signal channels 20, 40 each with the same arrangement of elements. The active elements are two input TTL NAND gates 21, 41, bipolar operational amplifiers 22, 42 and bipolar voltage buffers 23, 43. The outputs of the voltage buffers are connected with a balanced, two-wire data link.

The data signal, FIG. 2b, from a suitable source (not shown) is connected with one input of the first NAND gate 21. The data signal is also connected with an inverter 50 and the inverted data connected with an input of second NAND gate 41. A clock signal, FIG. 2a, at a frequency twice that of the data is connected with the other input of each of the NAND gates 21, 41. The outputs of the NAND gates are designated CO1 and CO$\phi$ respectively and are shown in FIGS. 2d, 2e. These signals represent the data and inverted data respectively in monopolar binary digital form at the clock frequency. Dead time intervals between the data pulses are at a zero signal level.

The NAND gate outputs CO1 and CO$\phi$ are cross-coupled to the inputs of the bipolar differential operational amplifiers 22, 42. More particularly, NAND gate output signal CO1 is connected with the inverting input of operational amplifier 22 and with the noninverting input of operational amplifier 42. Conversely, the signal CO$\phi$ from NAND gate 41 is connected with the inverting input of operational amplifier 42 and the noninverting input of operational amplifier 22.

The outputs of the operational amplifiers 22, 42 are bipolar complementary waveforms coupled to voltage buffers 23, 43 which have outputs CO+ and CO−, FIGS. 2f and 2g respectively. These signals are connected with the data link. The voltage buffers provide isolation but do not change the form of the signals.

The operation of differential operational amplifiers 22, 42 will be apparent from a consideration of the input and output signal waveforms. With a data zero the inverting input of amplifier 22 is low and the noninverting input is high. The output of amplifier 22 is high and the output of voltage buffer 23, FIG. 2b, is low. The inputs to differential amplifier 42 are reversed, with the noninverting input low and the inverting input high. The output of differential amplifier 42 is low and the output CO− of voltage buffer 43 is high. With a data 1, the input and output signal conditions are reversed. During the dead time interval between data pulses both inputs to the bipolar differential amplifiers 22, 42 are low and the outputs of both the differential amplifiers and the voltage buffers are $\phi$.

The output stages of NAND gates 21, 41 are open collector transistor circuits as indicated by the broken line connection from NAND gate 21 to the collector element of transistor 24, the emitter of which is returned to ground through resistor 25. A DC power source, as +5 V, is connected through resistor 26 with the NAND gate output and thus is in series with transistor 24 and emitter resistor 25. When transistor 24 conducts, a low condition for the NAND gate output, the output voltage level is determined by the five volt supply and the voltage divider of resistors 25, 26. This circuit configuration establishes the voltage level for signals CO1 and CO$\phi$ which are appropriate to develop the desired signal amplitudes CO+ and CO− at the outputs of differential operational amplifiers 22, 42 and buffer amplifiers 23, 43.

Both signal channels incorporate low pass filters. Only those in channel 20 will be described. Series resistor 27 and the shunt connected parallel combination of resistor 28 and capacitor 29 form a low pass filter with a time constant established primarily by capacitor 29. This filter is the principal element in establishing the rise and fall times of the signal CO+. A second low pass filter is provided by the RC feedback network of resistor 31 and capacitor 32 connected from the output of operational amplifier 22 to the inverting input. This filter limits the high frequency response of the data converter. Both filters contributes to stability of the data converter.

Voltage buffer 23 connected in the CO+ signal channel 20 between the output of operational amplifier 22 and the data link is a bipolar circuit connected across the positive and negative terminals of a DC power supply. Resistors 34, 35 in the power supply connections limit the current to the amplifier in the event of a short circuit or other fault condition of the data link. The voltage buffer has a high input impedance and the capability of providing a high output current. It establishes an appropriate load for the operational amplifier and isolates the operational amplifier from the data link which may be highly capacitive. Voltage buffer 43 serves the same function in the CO− signal channel 40.

I claim:

1. In a digital data communication system having sources of univerted and inverted monopolar digital data signals and a source of clock signals at a frequency twice the frequency of the data, a data converter comprising:
   first and second two input NAND gates each having one input connected with said clock signal source, the first NAND gate having its other input connected with said uninverted data source and the second NAND gate having its other input connected with the inverted data source, the outputs of the NAND gates being complementary monopolar data signals at the clock frequency; and
   first and second bipolar operational amplifiers having inverting and noninverting inputs crosscoupled to the outputs of said NAND gates, the outputs of the operational amplifiers being complementary bipolar data signals with intervals between data pulses.

2. The data converter of claim 1 in which the output of the first NAND gate is connected with the inverting input of the first operational amplifier and with the noninverting input of the second operational amplifier, and the output of the second NAND gate is connected with the noninverting input of the second operational amplifier and the inverting input of the first operational amplifier.

3. The data converter of claim 1 including low pass filters connected between the output of each NAND gate and the inputs of the operational amplifiers.

4. The data converter of claim 1 including low pass filters connected in the feedback loop of each of said operational amplifiers.

5. The data converter of claim 4 in which said low pass filters are parallel resistor-capacitor circuits connected between the output of each operational amplifier and the inverting input thereof.

6. The data converter of claim 3 including additional low pass filters connected in the feedback loop of each of said operational amplifiers.

7. The data converter of claim 1 in which each of said NAND gates has an open collector output circuit, the data converter including a DC voltage source and a resistor connected in series with each of the NAND gate output circuits across the DC voltage source forming voltage dividers establishing the voltage level of the monopolar signal data at the outputs of the NAND gates.

8. The data converter of claim 1 including a pair of voltage buffer amplifiers connected with the outputs of the operational amplifiers and having outputs connected with a data transmission line.

9. The data converter of claim 8 with a DC power source for said voltage buffers and current limiting resistors connected between the power source and the buffers, limiting current to the buffers in the event of a fault condition on the transmission line.

* * * * *